(12) United States Patent
Liu et al.

(10) Patent No.: US 8,014,134 B2
(45) Date of Patent: Sep. 6, 2011

(54) ELECTRONIC DEVICE ASSEMBLY

(75) Inventors: Bao-Shuai Liu, Shenzhen (CN); Yung-Hung Chu, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 72 days.

(21) Appl. No.: 12/607,979

(22) Filed: Oct. 28, 2009

(65) Prior Publication Data

US 2010/0124003 A1 May 20, 2010

(30) Foreign Application Priority Data

Nov. 20, 2008 (CN) .......................... 2008 1 0305653

(51) Int. Cl.
*H05K 5/03* (2006.01)
(52) U.S. Cl. ................ 361/679.01; 361/727; 455/575.4; 160/133

(58) Field of Classification Search ............. 361/679.01, 361/679.02, 679.21, 679.22, 679.26, 679.27, 361/724–727; 160/133, 236; 455/575.4
See application file for complete search history.

(56) References Cited

U.S. PATENT DOCUMENTS

| | | | |
|---|---|---|---|
| 5,805,535 A * | 9/1998 | Guyard et al. | 368/283 |
| 6,003,052 A * | 12/1999 | Yamagata | 708/100 |
| 7,072,699 B2 * | 7/2006 | Eiden | 455/575.8 |
| 2002/0092628 A1 * | 7/2002 | Todd | 160/309 |
| 2006/0046792 A1 * | 3/2006 | Hassemer et al. | 455/575.1 |
| 2008/0196842 A1 * | 8/2008 | Schoeren | 160/133 |
| 2009/0133316 A1 * | 5/2009 | Richter | 43/54.1 |

* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

An electronic device assembly comprises a protecting panel an electronic device, which comprises a shell with a front cover and a back cover and a display panel received in the shell. A plurality of sliding grooves is opened in the shell and extends from the front cover to the back cover. The protective cover is slidably set in the sliding grooves so as to cover the display panel in a first state or expose the display panel in a second state.

7 Claims, 7 Drawing Sheets

ELECTRONIC DEVICE ASSEMBLY

BACKGROUND

1. Technical Field

The present disclosure relates to an electronic device assembly.

2. Description of Related Art

Nowadays, many electronic devices, such as mobile phones, digital cameras, and others, utilize a display panel. To avoid damage to the display panel, a protective film is usually attached on the surface thereof. However, the protective film is thin, and cannot protect the display panel from excessive external force.

Therefore, what is need is an electronic device assembly which can protect its display panel.

DETAILED DESCRIPTION

Referring to FIGS. 1-4, an electronic device assembly 100 is provided. The electronic device assembly 100 includes an electronic device 10 and a protective cover 20. The electronic device 10 includes a display panel 15. In the exemplary embodiment, the electronic device 10, for example, is a mobile phone. The protective cover 20 is configured for covering the display panel 15, providing protection thereto.

The electronic device 10 includes a shell 12 for receiving the protective cover 20. The shell 12 includes a front cover 17 and a back cover 19. A receiving portion 170 is formed in the central section of the front cover 17, and is rectangular. The receiving portion 170 includes a bottom surface 171, a first sidewall 172, a second sidewall 174, and a third sidewall 175. The third sidewall 175 is connected to the first sidewall 172 and the second sidewall 174. The bottom surface 171 defines a rectangular hatch 271, which is configured for positioning the display panel 15. First sliding grooves 120, 122 are defined in the first sidewall 172 and the second sidewall 174 respectively. Further, the sliding groove 120 of the first sidewall 172 is symmetrical and parallel to the sliding groove 122 of the second sidewall 174. A first element 16 is mounted on the third sidewall 175.

A second receiving portion 190 is formed in the central section of the back cover 19, and is rectangular. The second receiving portion 190 includes a bottom portion 191, a first edge 192, a second edge 194, and a third edge 195. The third edge 194 is connected to the first edge 192 and the second edge 194. The bottom portion 191 is connected to the bottom surface 171 of the first receiving portion 170 by way of a curved surface. Second sliding grooves 124,125 are defined in the first edge 192 and the second edge 194 respectively. The sliding groove 124 of the first edge 192 is symmetrical and parallel to the sliding groove 125 of the second edge 194. The first edge 192 is connected to the first sidewall 172 by way of the curved surface, and the second edge 194 is connected to the second sidewall 174 by way of the curved surface, such that the second sliding grooves 124, 125 are smoothly connected to the first sliding grooves 120,122 respectively. A second element 18 is mounted on the third edge 195. In the exemplary embodiment, the height of the third sidewall 175 of the first receiving portion 170 equals the height of the third edge 195 of the second receiving portion 190.

Figure 1:
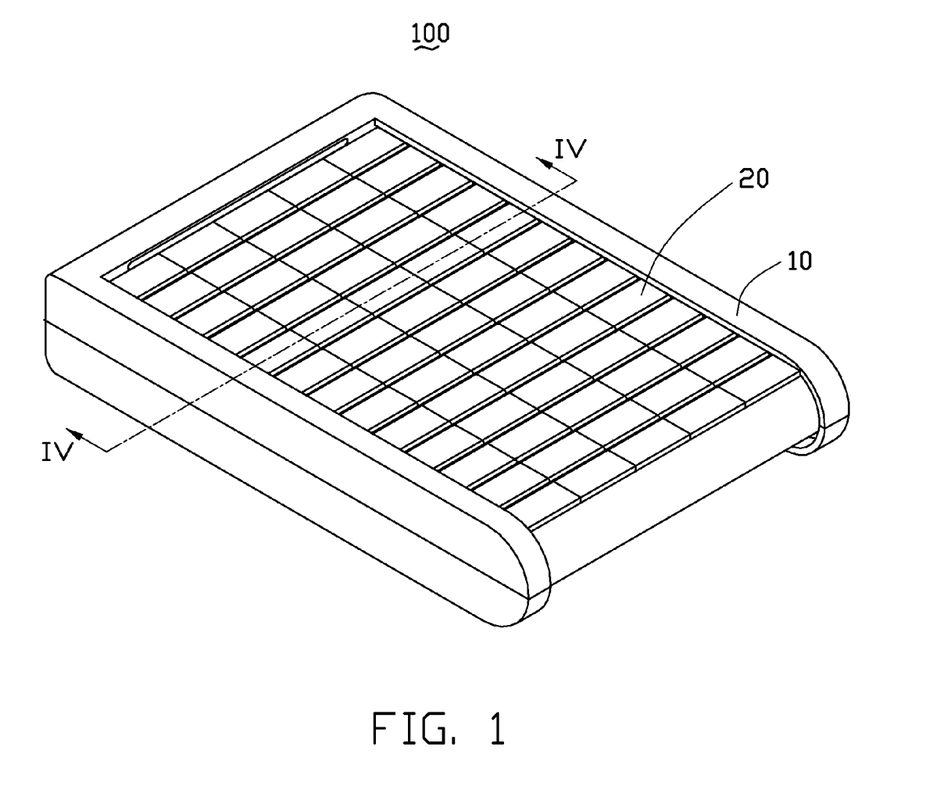
FIG. 1 is an isometric view of an electronic device assembly, including a protective cover, in accordance with an exemplary embodiment.
Figure 2:
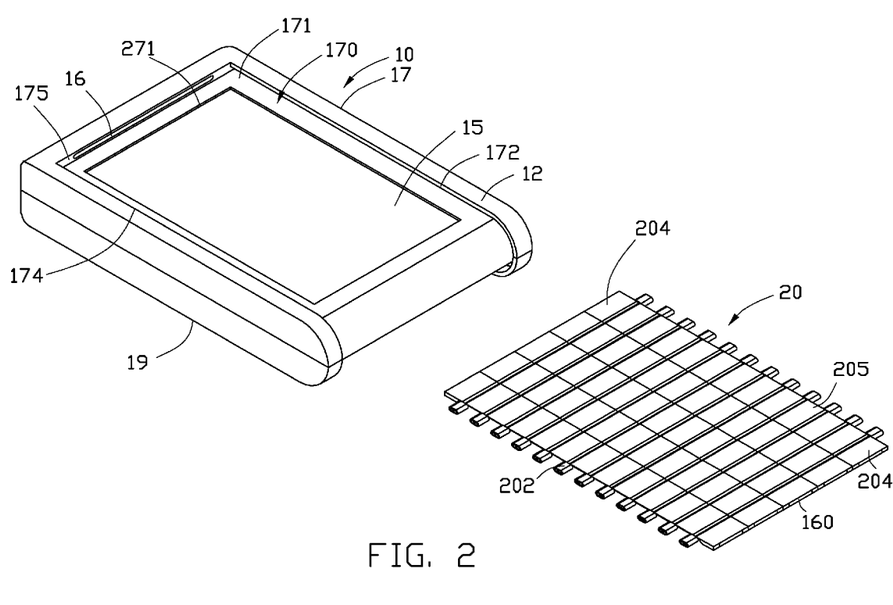
FIG. 2 is an exploded view of the electronic device assembly of FIG. 1.
Figure 3:
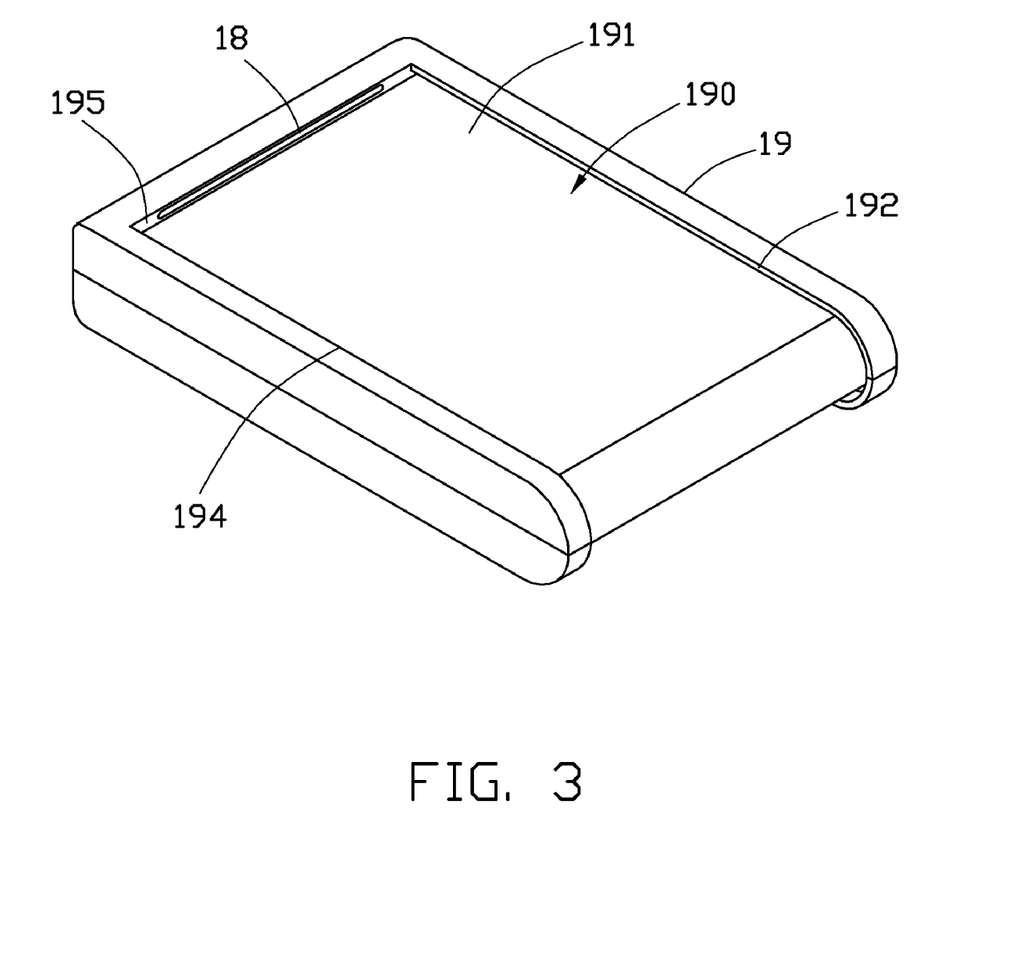
FIG. 3 is an isometric view of the electronic device of FIG. 1 from a reversed perspective.
Figure 4:
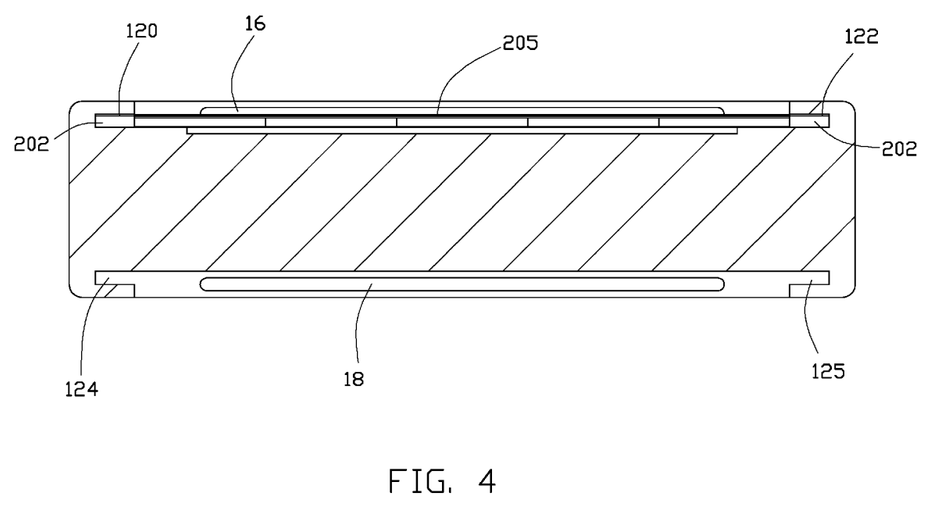
FIG. 4 is a cross sectional view of the electronic device taken along line IV-IV of FIG. 1.
Figure 5:
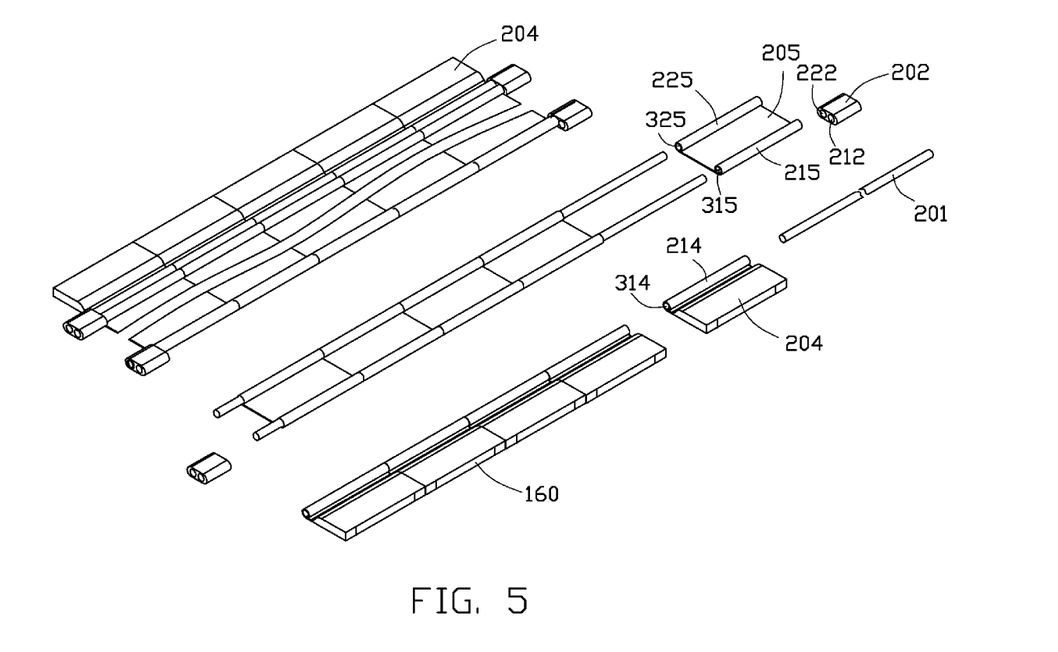
FIG. 5 is a partial exploded view of the protective cover.

Referring to FIG. 5, the protective cover 20 includes a plurality of axis pins 201, sliding elements 202, first structural elements 204, and second structural elements 205. The axis pin 201 is cylindrical. The sliding element 202 defines two cylindrical through holes 212, 222, through which the axis pins 201 pass respectively. The sliding element 202 slides from the first sliding grooves 120, 122 to the second sliding grooves 124, 125. The first structural element 204 is rectangular. One end of the first structural element 204 is curved towards the interior of the first structural element 204 to form a curved portion 214 with a cylindrical through hole 314. A third element 160 is set in each first structural element 204 arranged in two ends of the protective cover 20. In the exemplary embodiment, the first element 16, the second element 18 and the third element 160 are magnets. In other embodiments, the first element 16 and the second element 18 may be magnets and the third element 160 non-magnetic but attracted by the two magnets. The thickness of the first structural element 204 equals the thickness of the sliding element 202. The thickness of the first structural element 204 equals the height of the third edge 195 of the second receiving portion 190.

The second structural element 205 is rectangular. Two ends of the second structural element 205 are curved towards the interior of the second structural element 205 to form a curved portion 215 with a cylindrical through hole 315 and a curved portion 225 with a cylindrical through hole 325 respectively. The curved portion 214 of the first structural element 204 and the curved portions 215, 225 of the second structural element 205 are passed by the axis pins 201. In addition, the inner diameter of the curved portion 214 of the first structural element 204 and the inner diameter of the curved portions 215, 225 of the second structural elements 205 exceed the outside diameter of the axis pins 201. In the exemplary embodiment, the first structural element 204 and the second structural element 205 are hard material. The thickness of the second structural element 205 is less than that of the sliding element 202, and that of the first structural element 204.

During assembly of the protective cover 20, first, the two axis pins 201 pass through and align the curved portions 215, 225 and, accordingly, the second structural elements 205. In the exemplary embodiment, five second structural elements 205 are disposed. One end of the axis pin 201, passing through the curved portion 225 of the second structural element 205, is fixed in the through hole 212 of the sliding element 202, and one end of the axis pin 201 passing through the curved portion 215 of the second structural element 205 from another row, is fixed in the through hole 222 of the sliding element 202. The remaining two ends of the two axis pins 201 are fixed in the through holes 212, 222 of another sliding element 202 correspondingly, thereby fixing the axis pins 201 which do not rotate relative to the sliding element 202, and fixing the second structural elements 205 from two rows together. All the second structural elements 205 from different rows can be assembled together in similar fashion. In the exemplary embodiment, eleven rows of the second structural elements 205 are disposed.

The axis pins 201 pass through and align the curved portions 214 and, accordingly, the plurality of first structural elements 204. In the exemplary embodiment, five first structural elements 204 are disposed. One end of the axis pin 201 passing through the curved portion 214 of the first structural element 204, is fixed in the through hole 212 of the sliding element 202, and one end of the axis pin 201 passing through the curved portion 215 of the second structural element 205 from another row, is fixed in the through hole 222 of the sliding element 202. The other ends of the two axis pins 201 are fixed in the through holes 212, 222 of another sliding element 202 correspondingly, such that all the first structural elements 204 and all the second structural elements 205 are assembled together.

Finally, the axis pins 201 in turn pass through and align the curved portions 214, and, correspondingly, the plurality of other first structural elements 204 One end of the axis pins 201 passing through the curved portion 225 of the second structural element 205, is fixed in the through hole 212 of the sliding element 202, and one end of the axis pin 201, which passes through the curved portion 214 of the first structural element 204 from another row, is fixed in the through hole 222 of the sliding element 202. The other ends of the two axis pins 201 are fixed in the through holes 212, 222 of another sliding element 202 correspondingly, so that all the first structural elements 204 and all the second structural elements 205 are assembled together. Assembly of protective cover 15 is completed.

When assembling the electronic device assembly 100, the plurality of sliding elements 202 of each side of the protective cover 20 is slidably pushed to the first sliding grooves 120, 122 of the front cover 17 or the second sliding grooves 124, 125 of the back cover 19 until the protective cover 20 is received into the first receiving portion 170 or the second receiving portion 190. Then, the front cover 17 cooperates with the back cover 19 to form the shell 12.

As a result of the protective cover 20 being slidably situated in the first sliding grooves 120,122 or the second sliding grooves 124, 125, the display panel 15 maintains a first state when the display panel 15 is covered by the protective cover 20, and a second state when the display panel 15 is exposed by the protective cover 20.

When the display panel 15 is to be covered, the protective cover 20 is moved toward the first element 16 which exerts magnetic attraction on the third element 16. As a result, in the first state, the protective cover 20 covers the display panel 15, preventing damage thereto. Since the thickness of the sliding element 202 exceeds that of the second structural element 205, and the sliding element 202 of each side of the protective cover 20 is received in the first sliding grooves 120,122, the protective cover 20 and the display panel 15 are separated. Thus, when the protective cover 20 is subjected to external force, the second structural element 205 the separation distance serves to isolate the display panel from the force, and preventing damage thereto.

Since thickness of the first structural element 204 equals that of the third sidewall 175 of the first receiving portion 170, and thickness of the first structural element 204 equals that of the sliding element 202, when the sliding element 202 of each side of the protective cover 20 is received in the first sliding grooves 120, 122, the protective cover 20 and the third sidewall 175 reach the same level surface.

Figure 6:
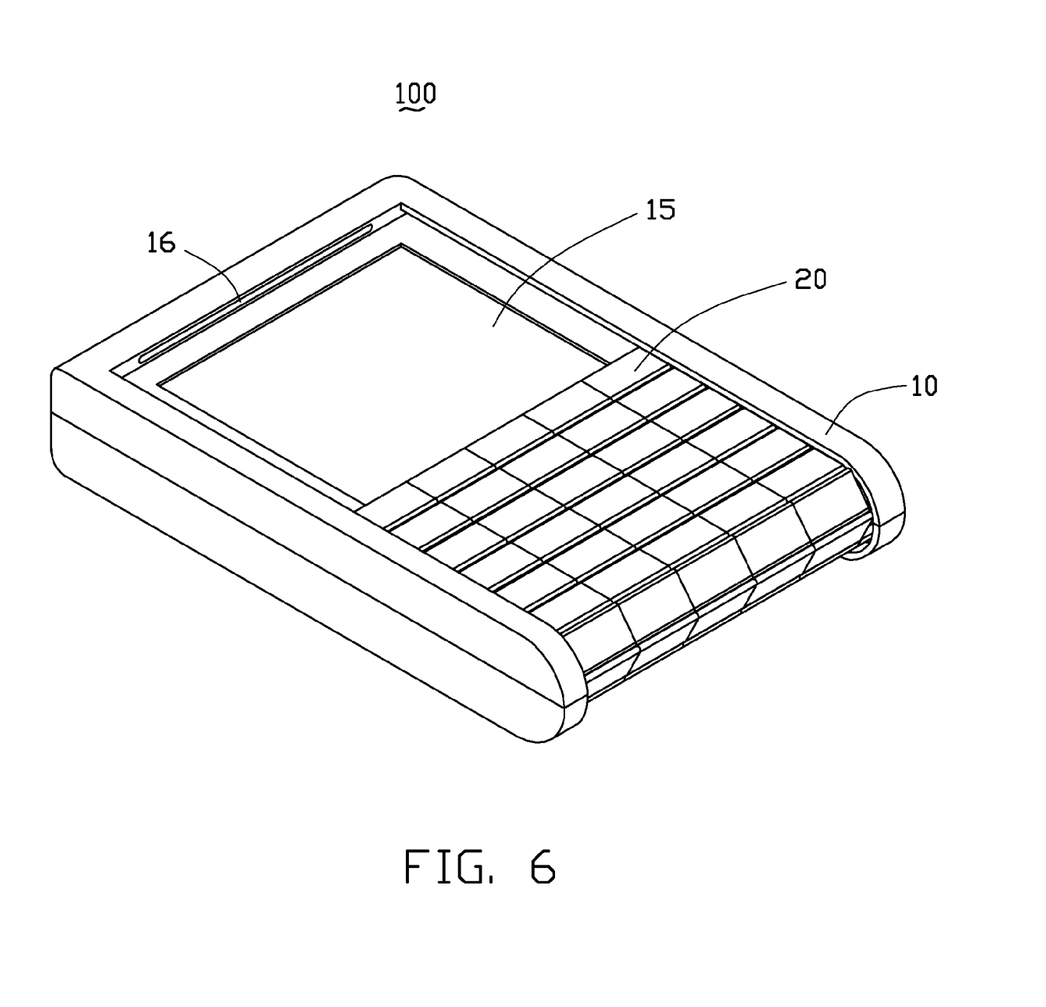
FIG. 6 is an isometric view of the protective cover of FIG. 1 in sliding.
Figure 7:
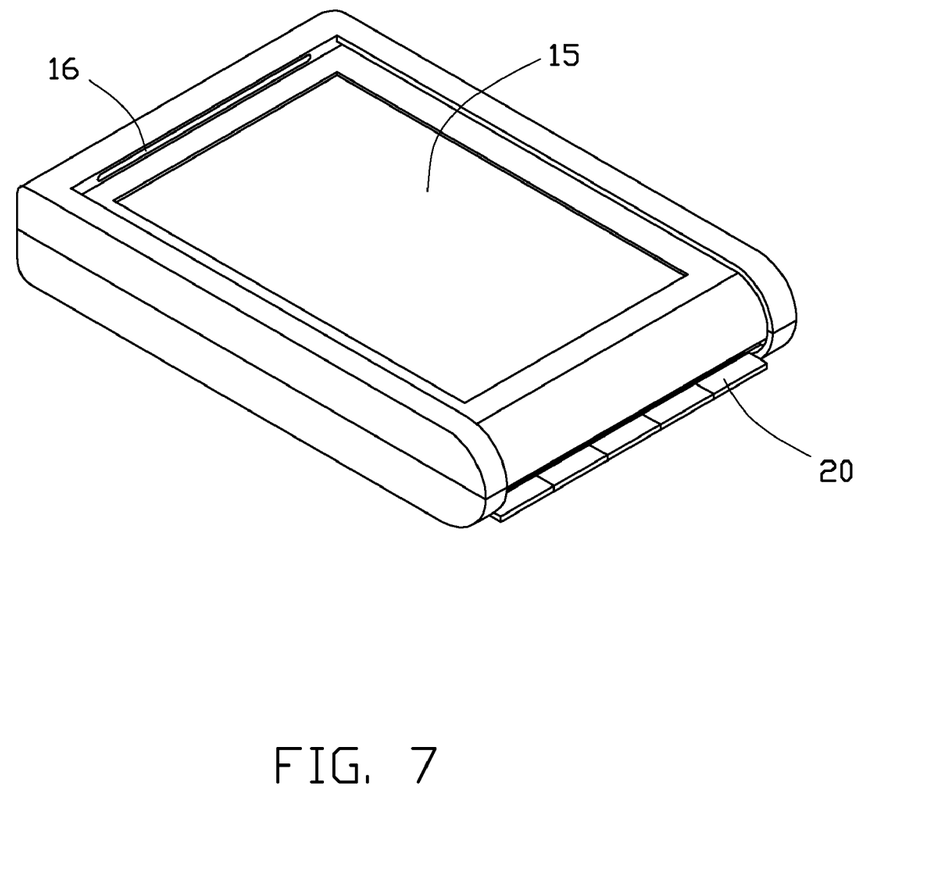
FIG. 7 is an isometric view of display panel of the electronic device of FIG. 1, with the display panel fully exposed.

Referring to FIG. 6, when the display panel 15 is to be uncovered, the sliding element 202 of each side of the protective cover 20 is slid in the first sliding grooves 120, 122 correspondingly, such that the third element 160 is disengaged and separated from the first element 16. The inner diameters of the curved portion 214 of the first structural element 204 and the curved portions 215, 225 of the second element 205 exceeding the outside diameter of the axis pin 201, allow the first structural element 204 and the second structural element 205 to correspondingly rotate relative to the axis pin 201. The protective cover 20 passes through the curved connection between the bottom surface 171 of the first receiving portion 170 and the bottom portion 191 of the second receiving portion 190, and as a result, the sliding element 202 of each side of the protective cover 20 slides from the first sliding grooves 120,122 of the front cover 17 to the second sliding grooves 124,125 of the back cover 19, and in the second sliding grooves 124, 125 until the second element 18 magnetically attracts the third element 160. Accordingly, in the second state, the display panel 15 is exposed by the protective cover 20, allowing display of data.

Further, since the thickness of the first structural element 204 equals the height of the third edge 195 of the second receiving portion 190, and the thickness of the first structural element 204 equals the thickness of the sliding element 202, when the sliding element 202 of each side of the protective cover 20 is received in the second sliding grooves 124, 125, the protective cover 20 and the third edge 195 reach the same level surface.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic device assembly comprising:
a protective cover;
an electronic device comprising a shell with a front cover and a back cover and a display panel received in the shell;
wherein two first sliding grooves are defined in the front cover and two second sliding grooves connected to the two first sliding grooves are defined in the back cover; a first receiving portion is formed in the front cover, a second receiving portion is formed in the back cover, a first element is set in the first receiving portion, a second element is set in the second receiving portion, and two third elements are set in two opposite ends of the protective cover, the first element, the second element and the two third elements are magnetic; and
wherein the first element attracts the third element to drive the protective cover slidably set in the two first sliding grooves to cover the display panel in a first state and the second element attracts the third element to drive the protective cover slidably set in the two second sliding grooves to expose the display panel in a second state.

2. The electronic device assembly as claimed in claim 1, wherein the first receiving portion comprises a bottom surface, a first sidewall, a second sidewall and a third sidewall, wherein the third sidewall is connected to the first sidewall and the second sidewall, the bottom surface is configured for supporting the display panel, and the two first sliding grooves are defined in the first sidewall and the second sidewall respectively;
wherein the second receiving portion comprises a bottom portion, a first edge, a second edge, and a third edge connected to the first edge and the second edge; and
wherein the bottom portion is connected to the bottom surface by way of a curved surface, and two sliding grooves are defined in the first edge and the second edge respectively.

3. The electronic device assembly as claimed in claim 1, wherein the protective cover comprises a plurality of axis pins, sliding elements configured for sliding from the first sliding groove to the second sliding groove, first structural elements, and second structural elements;

each sliding element defines two through holes through which the two axis pins pass;

one end of each first structural element is curved towards to an interior of each first structural element to form a curved portion with a through hole;

two ends of each second structural element are curved towards to an interior of the second structural element to form two curved portions with a through hole;

the plurality of axis pins in turn pass through the two curved portions of each second structural element to align the plurality of the second structural elements in one row;

each axis pin also in turn passes through the plurality of the curved portions of each first structural element to align the plurality of first structural elements in one row.

4. The electronic device assembly as claimed in claim 3, wherein a thickness of each sliding element equals a thickness of each first structural element and a thickness of each first structural element exceeds that of each second structural element.

5. The electronic device assembly as claimed in claim 3, wherein when each axis pin and each sliding element are connected; the axis pin slides relative to the first structural element and the second structural element correspondingly.

6. The electronic device assembly as claimed in claim 3, wherein each axis pin is cylindrical, and each first structural element and each second structural element are hard material.

7. The electronic device assembly as claimed in claim 3, wherein the two third elements are set in each first structural element arranged in two ends of the protective cover.

* * * * *